Oct. 14, 1941.         S. EVANS              2,258,751
METHOD OF MAKING WELDED TOOL JOINTS
Filed April 27, 1940

Seth Evans
INVENTOR
BY Jesse R. Stone
ATTORNEY

UNITED STATES PATENT OFFICE 2,258,751

METHOD OF MAKING WELDED TOOL JOINTS

Seth Evans, Houston, Tex., assignor to Hughes Tool Company, Houston, Tex., a corporation of Delaware Application April 27, 1940, Serial No. 331,917

4 Claims. (Cl. 29—157)

This invention relates to the method of making tool joints for use in coupling together sections of drill pipe employed in well drilling. The drill pipe, to which the well drill is attached serves to rotate the drill in the drilling operation and also serves to provide a conduit for the flushing fluid which is discharged under pressure upon the drill cutters and the well bottom to keep the cutters cool and to carry away the cuttings from the drill. The drill pipe is subject to heavy stresses and strains in use and must be so constructed that no weak points will develop where fracture or leakage may occur.

It is an object of this invention to provide a welded connection between the tool joint and the pipe which is so constructed that the welding line will be formed upon a point where the wall thickness is greater than that of the pipe.

It is my aim to employ a pipe section without any upset at the end where it is welded to the joint, and to make the weld in such manner as to leave a short upset on the pipe formed in the process of welding.

I desire to economize in material in the construction of the pipe and the joint and still make a welded connection which will be no weaker than is the pipe wall itself.

Figure 1:
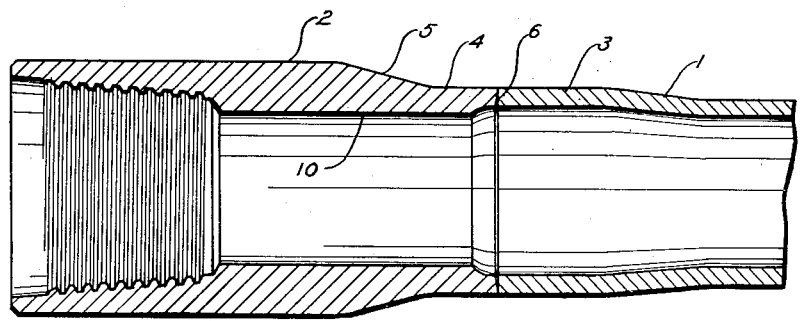
Fig. 1 is a longitudinal section through a tool joint and a pipe end positioned ready to be welded according to this invention.
Figure 2:
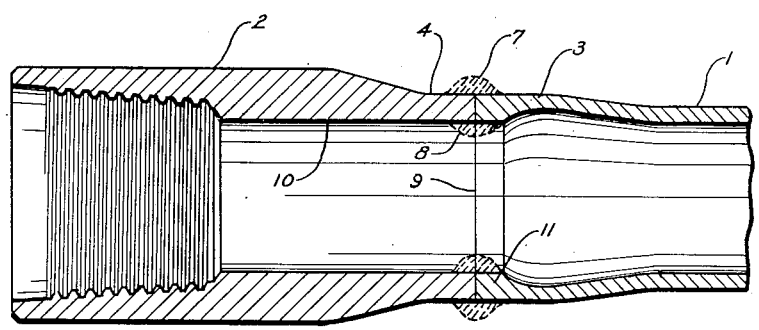
Fig. 2 is a similar view after the weld has been completed.

In carrying out my invention I employ a pipe section 1 which is shown as broken off. Such a section may be approximately 30 feet long. At its end which is to be welded to the joint member 2, the diameter of the pipe end is increased adjacent its extremity by rolling. Ordinary rolling expanders may be used to engage within the end of the pipe for a short distance and by pressure upon the pipe it may be expanded as shown at 3 to a predetermined diameter with the outer surface of the pipe flush or approximately so, with the adjacent end 4 of the tool joint. The amount of increase in diameter of the pipe is limited by the usual inner diameter of the elevator employed in handling the pipe.

The tool joint member 2 has comparatively thick walls and is commonly of better quality of steel than the steel of the pipe. The outer diameter of the joint is decreased to provide a tapered shoulder at 5 and a neck along the cylindrical area 4. The outer diameter at 4 is made to correspond to that of the pipe when said pipe is expanded, within approximate limits. Where the weld is to be made by the flash welding process, I prefer to bevel the end of the joint slightly at 6 so that the contact with the pipe end will be only adjacent the outer surface of the joint when the arc is initiated. The inner diameter of the joint end is also slightly reduced at the end to be welded to provide metal to be burned off in welding.

Where flash welding is used the electrodes are clamped to the joint and pipe ends and, when an arc is established between the pipe and joint, the joint is moved progressively toward the pipe as the adjacent ends of the two members are burned off. A short piece of each member will be burned away before the adjacent ends are heated to a state plastic enough for the weld and then the tool joint will be advanced forcibly against the pipe and the metal of the contacting ends will be displaced laterally as shown in dotted lines at 7 on the outside and 8 on the inside of the welding line 9.

After the weld has been cooled the upset metal at 7 is machined off flush with the tool joint as shown. The inner upset of metal at 8 is machined off along the plane of the inner surface 10 of the tool joint. When this is done, a portion of the upset metal 8 becomes attached integrally to the pipe end and forms a part thereof at 11. Thus the pipe has, in effect, an upset adjacent the weld line 9, so that, as the wall thickness of the pipe at the weld is greater than it is away from the weld, the strength of the pipe at the weld is found to be equal to or greater than that of the pipe away from the weld. Also it may be noted that the pipe wall is increased in strength by the increase in diameter.

Altho, the use of flash welding has been illustrated, the invention is applicable to other methods of butt welding. It is only necessary that the metal at the ends of the pipe and joint be sufficiently heated that when the parts are forced together at the push up, the fluid or plastic metal at the adjacent ends will be upset laterally, so as to form a thickened wall on the pipe side of the weld line.

Thus ordinary pipe without upset may be used and the weld will still be formed at a point where the wall is thicker than is the wall of the pipe before welding. A strong attachment of the joint to the pipe is thus obtained which will withstand the strains to which the joint and pipe are subject at least as well as will the pipe itself. Breaks along the weld line will thus be avoided.

Because of this method of welding I am enabled to use a cheaper form of drill pipe without upset, and still obtain a strong and durable weld which will endure as long as the pipe itself.

The pipe itself is increased in strength by its increase in diameter by expansion and the addition of extra metal to the pipe in the upsetting of metal in welding increases the wall thickness adjacent the weld and assures a connection which will not be a point of weakness in use.

What I claim is:

1. In welding a tool joint to a drill pipe end where the wall thickness of the joint is greater than that of the pipe, the steps of enlarging the diameter of the pipe end, heating the adjacent ends of said joint and pipe to a plastic state, pushing the said ends forcibly together to upset the plastic metal at the ends, and cutting away the metal thus upset to the same outer and inner diameter as the tool joint end so that the upset metal on the inner surface will form a thickened end upon the pipe side of the weld line.

2. In welding a tool joint to the end of a drill pipe section where the wall thickness of the joint is greater than that of the pipe, the steps of forming the end of the pipe section to the same outer diameter as the end of said tool joint, welding the ends of the pipe and joint together, upsetting the metal of the joint and pipe in the welding operation, and then machining away the upset metal to form the inner surface of the pipe adjacent the said welded ends, of the same inner and outer diameter as that of the tool joint end.

3. In welding a tool joint to the end of a drill pipe section where the wall thickness of the joint is greater than that of the pipe, the steps of bringing the outer surfaces of the pipe and joint at their ends flush with each other, flash welding the said ends together, upsetting the heated metal at the weld, cooling the weld, removing the upset metal sufficiently to bring the diameter of the pipe at its inner surface, flush with that of the joint at the weld whereby a thickened wall is formed at the end of the pipe portion of the same outer and inner diameter as that of the tool joint at the weld line.

4. In securing a tool joint to a pipe section the method consisting of forming the tool joint and pipe of approximately the same internal diameter, forming a neck upon said tool joint of greater wall thickness than that of the pipe, expanding the end of the pipe until the outer surface of the expanded end is of the same outer diameter as said neck, but welding said pipe end to said neck and displacing the metal of the joint and pipe inwardly at each side of the weld line and then cutting away the said upset metal to bring the inner surface of the joint and pipe flush with each other and of the original pipe diameter, thus forming a thickened end upon the pipe adjacent the weld line of the same internal and external diameter as said neck.

SETH EVANS.